(12) United States Patent
Driggers

(10) Patent No.: US 7,744,767 B2
(45) Date of Patent: *Jun. 29, 2010

(54) FLUID SEPARATION SYSTEM

(75) Inventor: Matt G. Driggers, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/267,736

(22) Filed: Nov. 10, 2008

(65) Prior Publication Data

US 2009/0065449 A1    Mar. 12, 2009

(51) Int. Cl.
*B01D 17/025* (2006.01)
*G03G 13/10* (2006.01)

(52) U.S. Cl. .................. 210/801; 210/521; 210/537; 210/539; 210/540; 347/93; 399/250

(58) Field of Classification Search .......... 210/521, 210/532.1, 536, 537, 538, 539, 540, 800.801; 347/89, 93; 399/250

See application file for complete search history.

(56) References Cited

U.S. PATENT DOCUMENTS

| | | |
|---|---|---|
| 597,258 A | 1/1898 | Bovee |
| 616,661 A | 12/1898 | Glenn |
| 2,799,645 A | 7/1957 | Musgrove |
| 3,767,300 A | 10/1973 | Brown |
| 3,856,682 A | 12/1974 | Summers |
| 3,862,039 A | 1/1975 | Summers |
| 3,933,654 A | 1/1976 | Middelbeek |
| 4,396,508 A | 8/1983 | Broughton |
| 4,492,630 A | 1/1985 | Rymal |
| 4,538,899 A | 9/1985 | Landa |
| 4,938,878 A | 7/1990 | Hall |
| 5,202,031 A | 4/1993 | Rymal |
| 5,368,747 A | 11/1994 | Rymal |
| 5,560,826 A | 10/1996 | Szereday et al. |
| 5,637,234 A | 6/1997 | McCasland |
| 5,708,938 A | 1/1998 | Takeuchi et al. |
| 5,905,928 A | 5/1999 | Shin |
| 5,922,094 A | 7/1999 | Richards |
| 6,101,356 A | 8/2000 | Kim |
| 6,141,518 A | 10/2000 | Shin |
| 2006/0096898 A1 | 5/2006 | Sato |

FOREIGN PATENT DOCUMENTS

JP    58116560    7/1983

*Primary Examiner*—Christopher Upton

(57) ABSTRACT

A system for separating a mixture of two fluids of different specific gravities comprising:
 a first chamber having an inlet for receiving said mixture;
 a second chamber having a connection for receiving the fluid with the higher specific gravity of said mixture from said first chamber, said connection being situated between a portion of the two chambers below the inlet; and
 a waste outlet in said first chamber to drain residue situated at an interface between the two fluids.

23 Claims, 6 Drawing Sheets

FLUID SEPARATION SYSTEM

FIELD OF THE INVENTION

The present invention relates generally to separating fluids of different specific gravities.

BACKGROUND OF THE INVENTION

Many different systems for separating immiscible fluids of different specific gravities have been introduced over the years. These systems are useful for example in the disposal of water contaminated by other fluids such as oil, gasoline and antifreeze. In some cases such systems allow collecting both fluids.

Typically these systems comprise two separate sides with a fluid path connecting them on the bottom. One side receives the mixture of the contaminated fluid. The lighter fluid rises to the top of the receiving side and the other side typically contains the heavier fluid. Outlets on each side allow discharge of the separated fluids.

The mixture of the contaminated fluid is supplied to the device at a rate at which the system can separate the fluids in order to receive the correct fluids at the outlets. U.S. Pat. No. 5,637,234 to McCasland, the disclosure of which is incorporated herein by reference, describes apparatus and method for separating fluids having different specific gravities and for increasing the rate of separating the fluids.

In some cases, in the separation system, at the interface between the lighter fluid and the heavy fluid, a fungus or combination fluid or other undesired material (such as colorants or other materials) develops or is collected (trapped), which is heavier than the light fluid and lighter than the heavy fluid. The waste is typically removed by emptying out the system or by dismantling it.

In liquid toner printing systems, especially those in which the liquid toner is heated during the printing process, carrier liquid, which is lighter than water, is evaporated. Since this material is generally a hydrocarbon whose release into the atmosphere is restricted, some prior art systems have been known to condense the carrier liquid, together with moisture from a system enclosure, prior to venting air from the enclosure to the outside.

In U.S. Pat. No. 4,538,899, carrier liquid evaporated from printed sheets, which may be mixed with water vapor is catalytically oxidized to provide a hot vapor. The hot vapor is used to heat a substrate to fix an image thereon.

SUMMARY OF THE INVENTION

An aspect of some embodiments of the invention relates to a separation system with a waste outlet that allows draining the waste that develops between the lighter fluid and the heavier fluid. In some embodiments of the invention, the waste outlet is positioned directly below the position of the interface between the two fluids. In some embodiments of the invention the mixture is supplied at a high inlet above the waste outlet. Alternatively, the mixture is supplied at a low inlet below the waste outlet. In some embodiments of the invention, the position of the inlet is selected according to the fluid that is more preferentially being salvaged. For example in a water-oil system, a high inlet is preferred for salvaging oil and a low inlet is preferred for salvaging water.

In an exemplary embodiment of the invention, the system is constructed with a secondary outlet for one or both of the fluids in order to protect the system from a clogged outlet and/or backflow of the fluid from its primary outlet. In some embodiments of the invention, the secondary outlet is positioned above the primary outlet. Alternatively, the secondary outlet is positioned at the same level, adjacent or opposite the primary outlet.

In some embodiments of the invention, the system is constructed with a secondary purifying level for one or both of the fluids, to reach a higher level of purity of the fluid.

There is thus provided, in accordance with an exemplary embodiment of the invention, a system for separating a mixture of two fluids of different specific gravities comprising:

a first chamber having an inlet for receiving said mixture;

a second chamber having a connection for receiving the fluid with the higher specific gravity of said mixture from said first chamber, said connection being situated between a portion of the two chambers below the inlet; and a waste outlet in said first chamber to drain residue situated at an interface between the two fluids.

Optionally, the inlet is above said fluid interface. Alternatively, the inlet is below said fluid interface.

In an embodiment of the invention, the system includes a first outlet for the fluid having the lower specific gravity in the reception chamber. Optionally, the system comprises a second outlet for the fluid having the higher specific gravity, in the second chamber. Optionally, the system comprises a third outlet in the second chamber, above the second outlet. Optionally, the third outlet is at the same height as the first outlet. Alternatively, the third outlet is at a lower height than the first outlet.

In an embodiment of the invention, the system comprises a second outlet for the fluid having the higher specific gravity in the second chamber. Optionally, the system comprises a third outlet in the second chamber, above the second outlet.

In an embodiment of the invention, the system comprises a separation unit connected to the first outlet. In an embodiment of the invention, the system comprises a fourth outlet from the first chamber, the fourth outlet being higher than the first outlet.

In an embodiment of the invention, the system comprises a second level separation unit connected to the outlet of the fluid having the higher specific gravity. Optionally, the system comprises a drain outlet for the separation unit.

There is further provided, in accordance with an embodiment of the invention, a system for separating a mixture of two fluids of different specific gravities comprising:

a first chamber having an inlet for receiving said mixture;

a second chamber having a connection for receiving the fluid having the higher specific gravity of said mixture from said first chamber, said connection being situated between a portion of the two chambers below the inlet;

a first outlet in the second chamber for the fluid having the higher specific gravity;

a second outlet in the first chamber for the fluid having the lower specific gravity, said second outlet being higher than the first outlet; and at least one additional outlet comprising one or both of a) an additional outlet in the second chamber, said additional outlet being higher than said first outlet and lower than said second outlet; and b) an additional outlet in the first chamber, said additional outlet being higher than said second outlet.

Optionally, the at least one additional outlet comprises an additional outlet in the second chamber, said additional outlet being higher than said first outlet and lower than said second outlet.

Optionally or additionally, the at least one additional outlet comprises an additional outlet in the first chamber, said additional outlet being higher than said second outlet.

There is further provided, in accordance with an embodiment of the invention, a printing system comprising:

an enclosure;

a printing engine within said enclosure, in which liquid ink comprising a carrier liquid is used to produce images, some of said carrier liquid being evaporated during printing;

a condenser that condenses liquid carrier from within the enclosure, together with moisture from air in the enclosure;

a separator that receives the condensed mixture of carrier liquid and moisture and separates the carrier liquid from the moisture; and a conduit that delivers the separated carrier liquid to the printing engine for reuse.

Optionally, the separator is a separator system according to the invention.

There is further provided, in accordance with a preferred embodiment of the invention, a printing system comprising:

an enclosure;

a printing engine within said enclosure, in which liquid ink comprising a carrier liquid is used to produce images, some of said carrier liquid being evaporated during printing;

a condenser that condenses liquid carrier from within the enclosure, together with moisture from air in the enclosure;

a separator system according to the invention, that receives the condensed mixture of carrier liquid and moisture and separates the carrier liquid from the moisture.

In an embodiment of the invention, the liquid ink is a liquid toner and wherein the liquid toner is heated during the printing, evaporating the carrier liquid.

In an embodiment of the invention, the carrier liquid is a liquid hydrocarbon.

BRIEF DESCRIPTION OF THE DRAWINGS

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EXEMPLARY EMBODIMENTS

Figure 1:
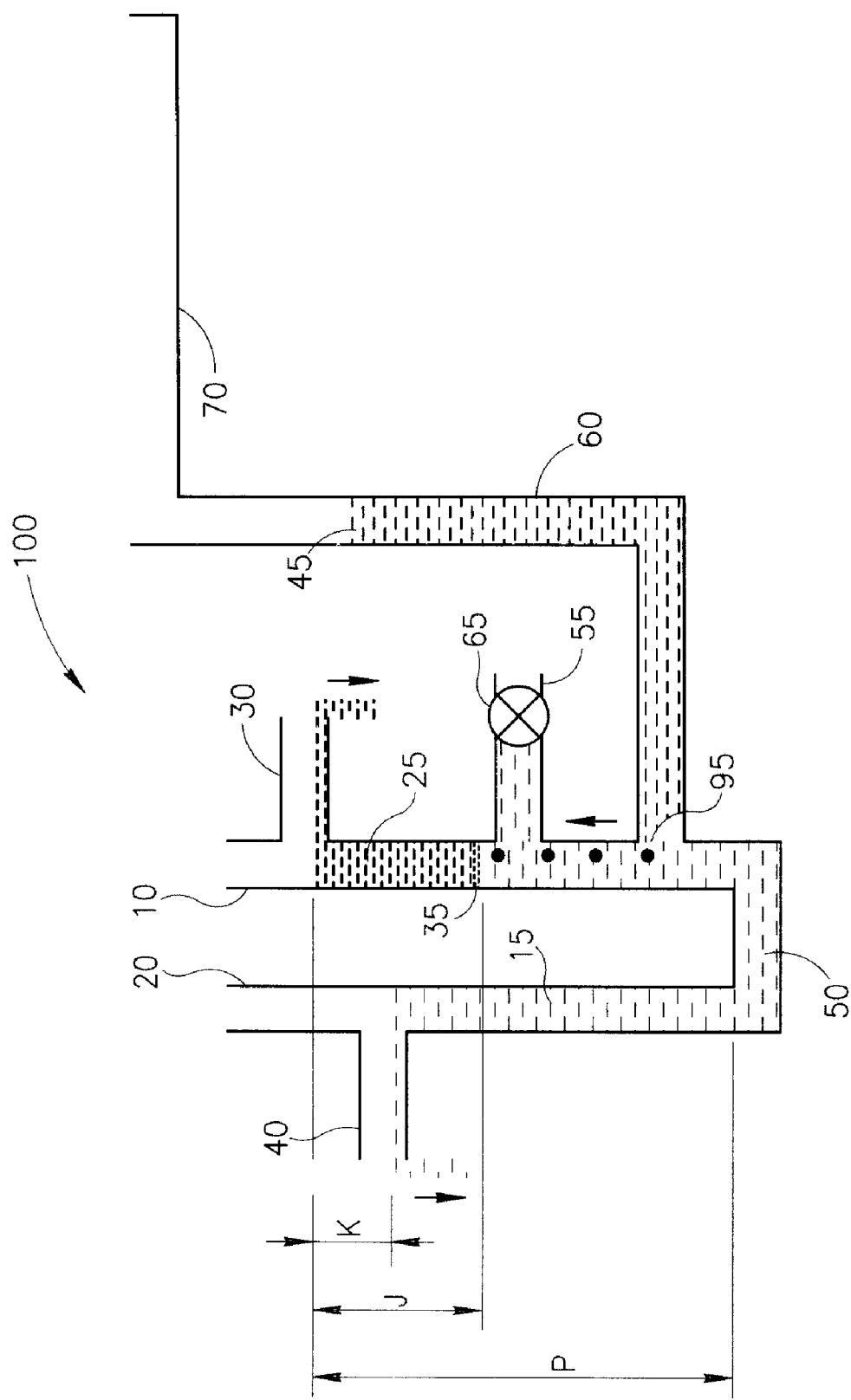
FIG. 1 is a schematic illustration of a separation system with a low inlet according to an exemplary embodiment of the invention.

FIG. 1 is a schematic illustration of a separation system 100 according to an exemplary embodiment of the invention. In an exemplary embodiment of the invention, separation system 100 comprises a main chamber 10 and a secondary chamber 20. Main chamber 10 and secondary chamber 20 are connected together at the bottom with a fluid connection path 50. In some embodiments of the invention, chamber 10, chamber 20 and connection path 50 are comprised from a single chamber, in which left and right sides 10 and 20 are separated, for example, by a baffle. In such a case connection path 50 is almost virtual since it is reduced to the width of the separation between the chambers.

In an exemplary embodiment of the invention, a mixture of fluids 45 with different specific gravities, for example water and oil, are directed to a container 70. Optionally, the mixture is physically, positioned higher than chamber 10 in order for it to be able to flow to separation system 100 by the force of gravity. Optionally, container 70 is connected by a conduit 60 to an inlet 95 on the lower part of chamber 10 above connection path 50. Alternatively conduit 60 is connected to an inlet 95 on the upper part of chamber 10 as described below regarding FIG. 2. However, as indicated in the figure, the level of the input mixture will be between the heights of outlets 30 and 40, based on the amount of each fluid in the mixture.

Optionally a large tray such as container 70 is used to receive the mixture, as for example, when the source of the mixture is a condenser. Alternatively, the mixture can be piped directly into 10.

In an exemplary embodiment of the invention, on the upper part of chamber 10 there is an outlet 30 for the lighter fluid and on the upper part of chamber 20 there is an outlet 40 for the heavier fluid. In some embodiments of the invention, a continuous flow of mixture 45 is supplied to separation system 100. The continuous flow enters chamber 10 and separates itself under the influence of the gravitational force. The heavier fluid 15 (e.g. water) sinks to the bottom of chamber 10 and the lighter fluid 25 (e.g. oil), rises to the top of chamber 10. The heavier fluid 15 flows from chamber 10 through connection 50 to chamber 20 and flows out of outlet 40. Lighter fluid 25 is blocked by the separation between chamber 10 and chamber 20 from spreading through the rest of separation system 100, lighter fluid 25 rises to the top of chamber 10 and flows out through outlet 30.

In some embodiments of the invention, separation system 100 is initialized by filling it with the heavy fluid 15 in order to prevent mixture 45 from reaching chamber 20, which would cause an initial output of some of lighter fluid 25 from outlet 40. Alternatively, the initial flow from outlet 40 is optionally discarded until separation system 100 stabilizes, wherein chamber 20 comprises only heavy fluid 15. To empty the system, a valve (not shown) is conveniently provided at the bottom of passage 50 or at the bottom of chamber 10 or chamber 20. Opening this valve will empty the system.

In an exemplary embodiment of the invention, the top of chamber 10 and/or chamber 20 and/or container 70, are optionally vented to the atmosphere in order to prevent a build up of pressure on the fluids in the chambers. If not so vented, it may be desirable to connect the tops of chambers 10 and 20 to avoid air pressure differentials between the chambers.

In an exemplary embodiment of the invention, at the interface between lighter fluid 25 and heavier fluid 15, a layer 35 comprised of a fungus and/or an amalgam of the fluids or other undesired waste is formed due to a small amount of interaction between the two fluids although they are essentially immiscible. Additionally contaminants which are lighter than the heavier fluid but heavier than the lighter fluid will remain trapped between the two fluids. Layer 35 may comprise a gel.

In some embodiments of the invention, a waste outlet 55 is positioned directly below the position of layer 35, which is defined by the specific gravity of the two fluids. Optionally, waste outlet 55 is closed with a valve 65, which is periodically opened for a short time, in order to dispose of contaminants that are trapped between the fluids.

In an exemplary embodiment of the invention, outlet 30, is positioned at a height P above the top of fluid connection path 50. Optionally, P is selected tall enough to accommodate inlet 95, outlet 55 and outlet 30 with spacing between them to accommodate a buildup of the various fluids between the ports (95, 55, 30). Optionally, a larger value of P will contribute to a finer separation of the fluids, since it allows for a longer flow path before exiting the system outlets. P can be increased if higher flow is desired. In addition, since separation of the fluids takes place in chamber 10, this chamber should be made wide enough (or of a large enough diameter if round) to allow enough time for separation to take place, considering the flow rate.

It should be noted that the system does not have any intrinsic limitation on flow rate. However, as the flow rate is increased, the amount of time the mixture remains in chamber 10 is decreased, so that separation may be incomplete. The dimensions should be adapted to take into consideration the purity desired, the flow rate expected and the speed with which the materials separate.

The position J of the interface between the two fluids in chamber 10 below outlet 30 is determined by the height difference K of outlet 30 and outlet 40 and the value of the specific gravity of the fluids. The following equation shows the resulting relationship:

$$J=K/((SG(H)-SG(L))$$

SG(H)—specifies the specific gravity of the heavy fluid.

SG(L)—specifies the specific gravity of the light fluid.

In an exemplary embodiment of the invention, with water as the heavy fluid (SG(H)=1) and with an oil as the light fluid (e.g., SG(L)=0.75) the vertical distance of the position of the interface between the two fluids from the oil outlet 30 is 4 times the vertical distance of the water outlet from the oil outlet. Optionally, based on such a calculation waste outlet 55 is positioned below the interface position. The height outlet 55 above the top of conduit 50 is chosen to leave a quantity of heavier liquid in chamber 10. When outlet 55 is open, the level of liquid in chamber 20 will fall as will the level of light liquid in chamber 10. If the height of outlet 55 is too low, the lighter liquid will pass into chamber 20, from which it can only be removed by draining the whole system.

Figure 2:
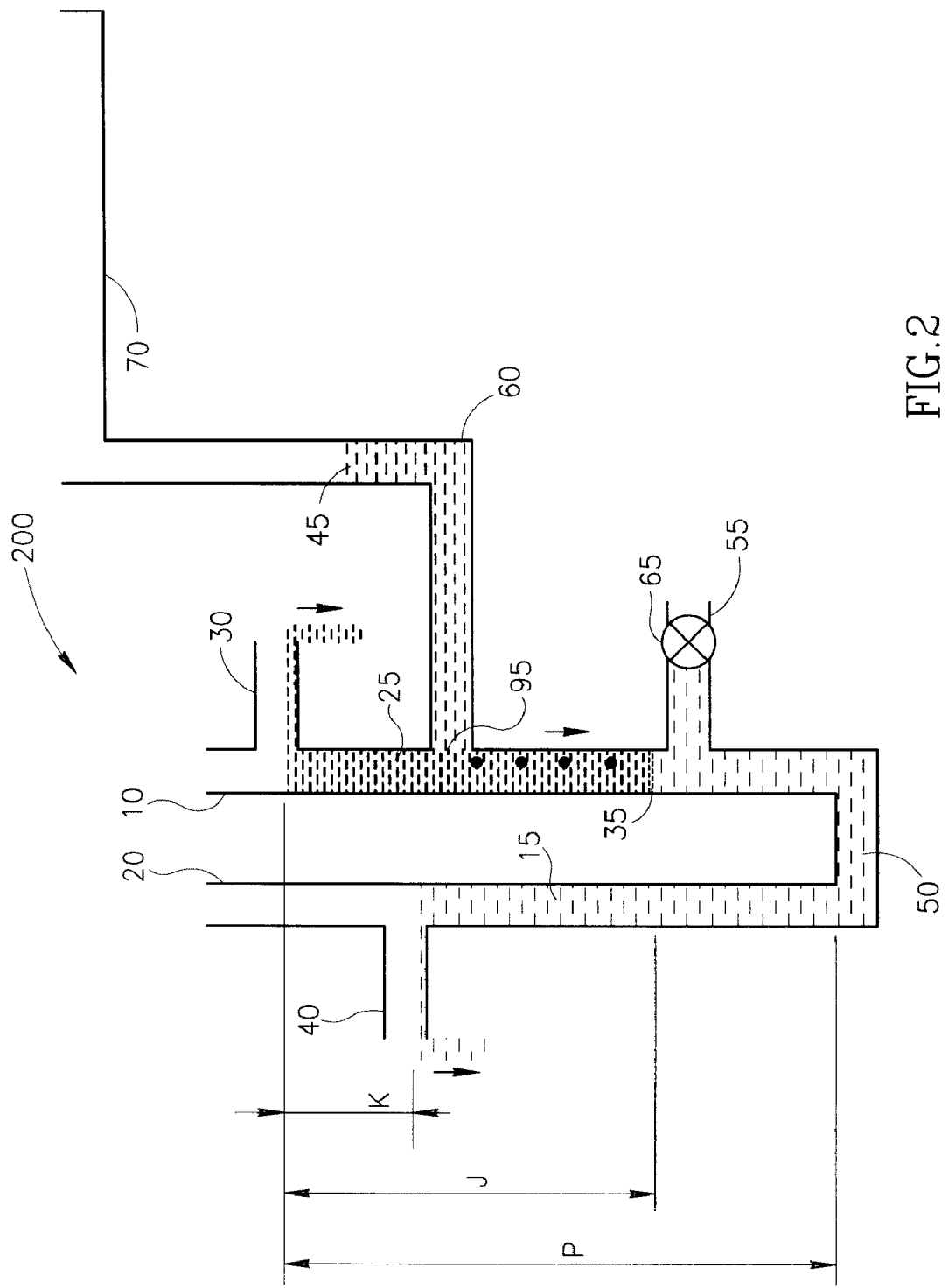
FIG. 2 is a schematic illustration of a separation system with a high inlet according to an exemplary embodiment of the invention.

FIG. 2 is a schematic illustration of a separation system 200 with a high inlet according to an exemplary embodiment of the invention. In some embodiments of the invention, inlet 95 is positioned on the upper portion of chamber 10, wherein mixture 45 enters separation system 200 into the volume containing lighter fluid 25, as shown in FIG. 2. In a system with a high inlet 95, heavy fluid 15 sinks to the bottom of chamber 10 and light fluid 25 remains in the upper volume. In a separation system 200 with a high inlet 95, the position of the interface 35 between the fluids and correspondingly waste outlet 55 are positioned below inlet 95, in contrast to being above inlet 95 in a separation system 100 with a low inlet 95.

In some embodiments of the invention, purification of one of the fluids is of more important and the other is less important. For example, one of the fluids may be expensive and/or it may be costly or hazardous to discard so it is salvaged for reuse (e.g. an expensive oil). Alternatively or additionally, one of the fluids may be a by-product, which needs to be cleaned to a reasonable level in order to be discarded (e.g. contaminated water).

In some embodiments of the invention, separation system 200 is used to salvage lighter fluid 25 and optionally discard heavy fluid 15. In such a case a high inlet is optionally used as shown in FIG. 2, to prevent lighter fluid 25 from collecting additional contaminants by passing through layer 35. In such a case heavier fluid 15, which is to be discarded will sink down through layer 35. In contrast separation system 100 is optionally used to salvage heavy fluid 15 and optionally discard lighter fluid 25. In separation system 100 a low inlet is used so lighter fluid 25 passes through layer 35 and heavier fluid 15 will optionally, be less contaminated.

Figure 3:
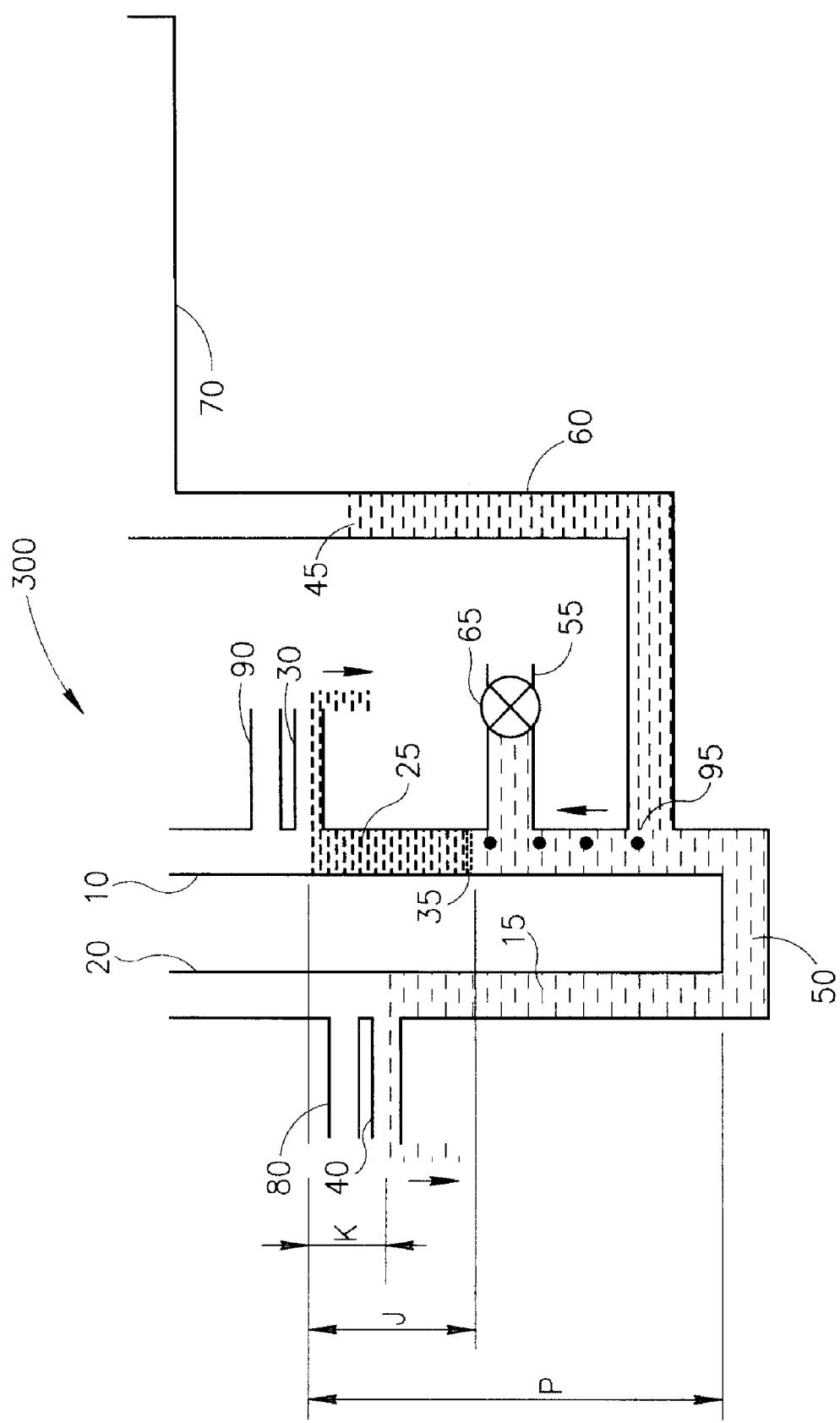
FIG. 3 is a schematic illustration of a separation system with secondary outlets according to an exemplary embodiment of the invention.

FIG. 3 is a schematic illustration of a separation system 300 with secondary outlets according to an exemplary embodiment of the invention. In some embodiments of the invention, an additional outlet 80 is provided as an auxiliary for outlet 30 and an additional outlet 90 is provided as an auxiliary for outlet 40. The additional outlets 80, 90 serve as safeguard outlets for the respective primary outlets to prevent fluid mixing due to backflow from a disturbance in a primary outlet channel. Alternatively or additionally, the additional outlets serve to overcome clogging in the primary outlet. In some embodiments of the invention, additional outlets 80, 90 are positioned directly above their respective primary outlets, wherein optionally outlets 40 and 80 are positioned lower than outlets 30 and 90, in order to prevent a backup of the denser fluid into the less dense outlet channels. Alternatively or additionally, additional outlets 80, 90 are positioned adjacent to the primary outlet or opposite the primary outlet in the same chamber. Optionally, additional outlets 80, 90, serve in parallel with the primary outlet to provide backup to the fluid flow.

Figure 4:
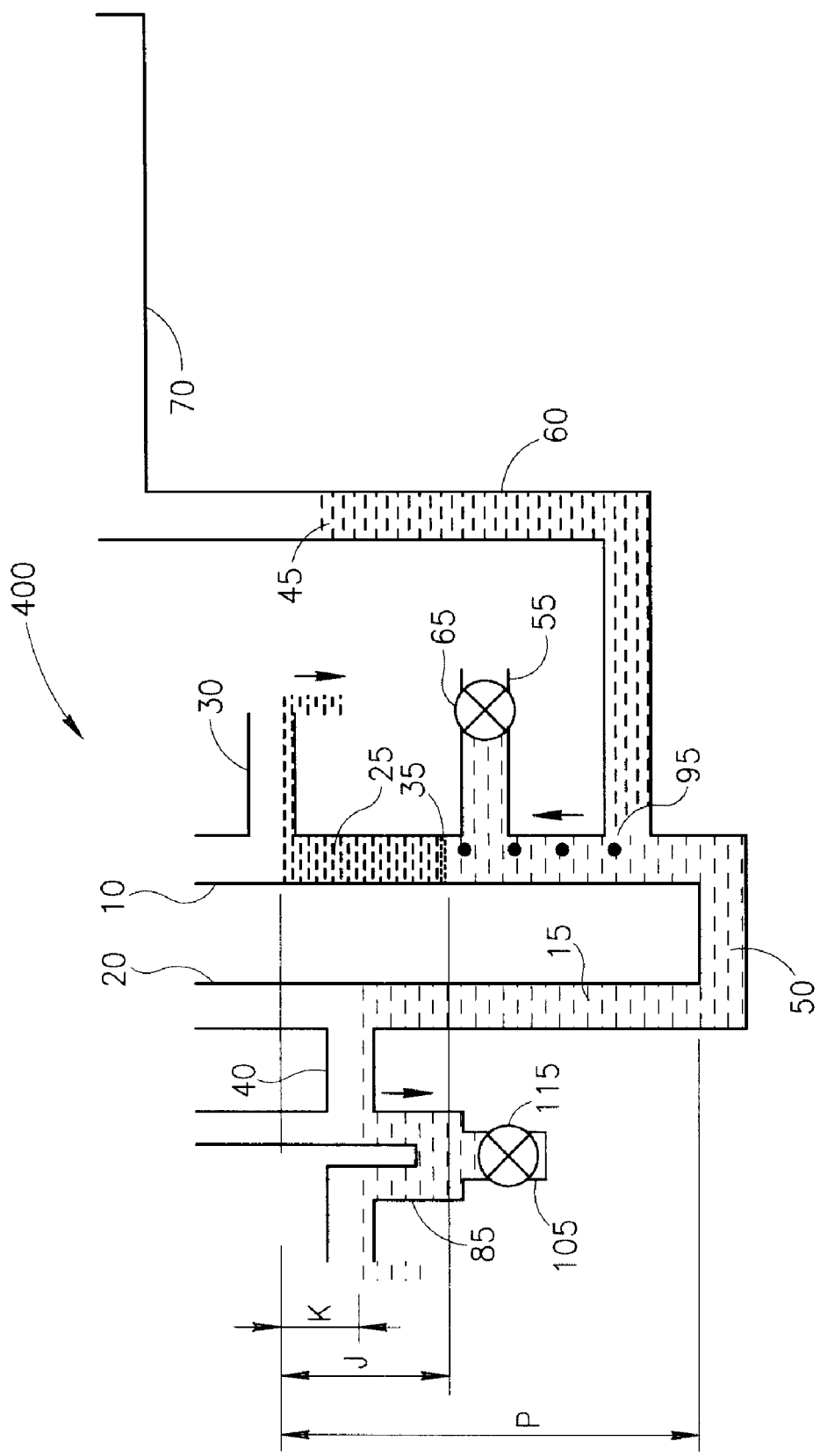
FIG. 4 is a schematic illustration of a separation system with a secondary purifying level according to an exemplary embodiment of the invention.

FIG. 4 is a schematic illustration of a separation system 400 with a secondary purifying level according to an exemplary embodiment of the invention. In some embodiments of the invention, separation system 400 comprises a secondary purifying level to enhance the purity of the separated fluids. FIG. 4 shows a secondary purifying level 85 for the heavier fluid. Optionally, secondary purifying level 85 comprises a "U" shaped system of the same size or different size such as provided by the first purifying level.

In some embodiments of the invention, a secondary purifying level can be for the heavier fluid, the lighter fluid or both. In some embodiments of the invention, secondary purifying level 85 blocks any residue of lighter fluid 25 that managed to pass through with fluid 15 to chamber 20 or other contaminants. Optionally, the residue of lighter fluid 25 will be trapped at outlet 40 in chamber 20 as a result of its lighter specific gravity. In some embodiments of the invention, an escape outlet 105 with a valve 115 is added at the bottom of purifying level 85, in order to allow periodic drainage of the trapped residue of lighter fluid 25 and other contaminants.

Figure 5:
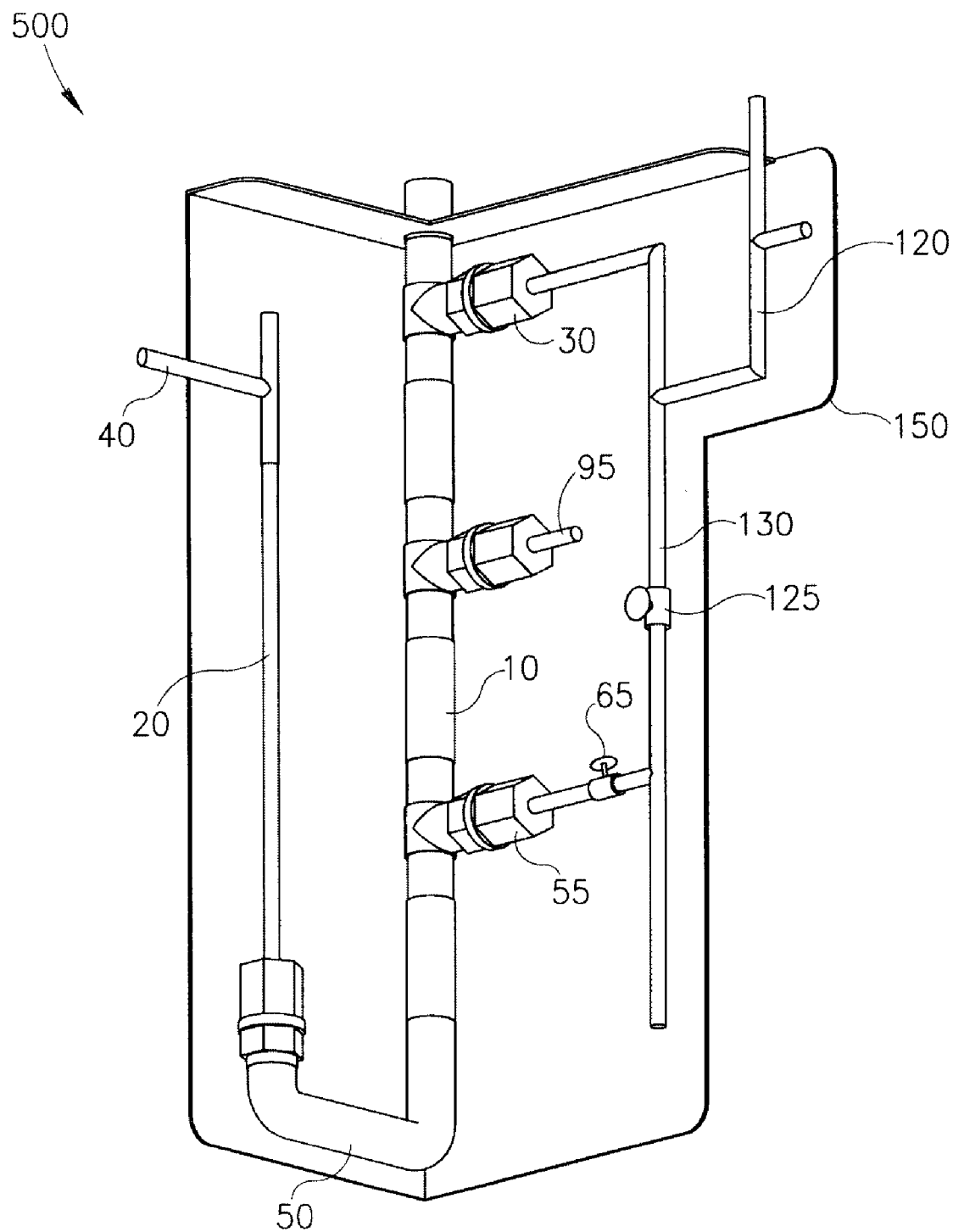
FIG. 5 is a schematic illustration of an implementation of a separation system according to an exemplary embodiment of the invention.

FIG. 5 is a schematic illustration of an implementation of a separation system 500 according to an exemplary embodiment of the invention. FIG. 5 shows separation system 500 constructed from standard plumbing pipes, connectors and fixtures, as known in the art. The plumbing elements may be standard ⅜" ½" or ¾" (or other size) connectors and pipes or may be larger or smaller depending on the size required. The pipe may also be welded or soldered.

In some embodiments of the invention, the system may be very large (e.g. several meters high) or very small (e.g. a few centimeters high), depending on the application.

In some embodiments of the invention, the plumbing elements are comprised from standard plumbing materials as known in the art, for example plastic, rubber, copper and/or other metals or materials that are commonly used.

In an exemplary embodiment of the invention, separation system 500 is supported by being attached to a supporting board 150, to hold the elements of the system in place without relying on separating system 500 to support itself. Optionally, supporting board 150 can be the wall of a building or any solid structure.

As described above for separation system 100, separation system 500 comprises two pipe chambers 10 and 20 connected together on the bottom with a pipe 50. Separation system 500 further comprises a lighter fluid outlet 30, a heavy fluid outlet 40, a mixture inlet 95 and a waste outlet 55 with a valve 65. Optionally, chambers 10 and 20 are vented to the atmosphere to eliminate the buildup of pressure in the chambers.

Similar to the secondary purifying level 85 for the heavy fluid, shown in FIG. 4, separation system 500 is shown with a secondary purifying level 120 for the lighter fluid. Residue of any heavy fluid or other contaminant that managed to exit from outlet 30 will be trapped in a pipe 130, and blocked by a valve 125. By periodically opening valve 125 the residue heavy fluid can be drained out.

It some embodiments of the invention, separating system 100 can be constructed using other methods, for example, using a mold to create it from plastic, glass, asbestos or any other material, the same being flame resistant, if need be.

In some embodiments of the invention, separating system 100 can be heated or constructed with built-in heating elements in order to accelerate the separation process of the fluids.

Figure 6:
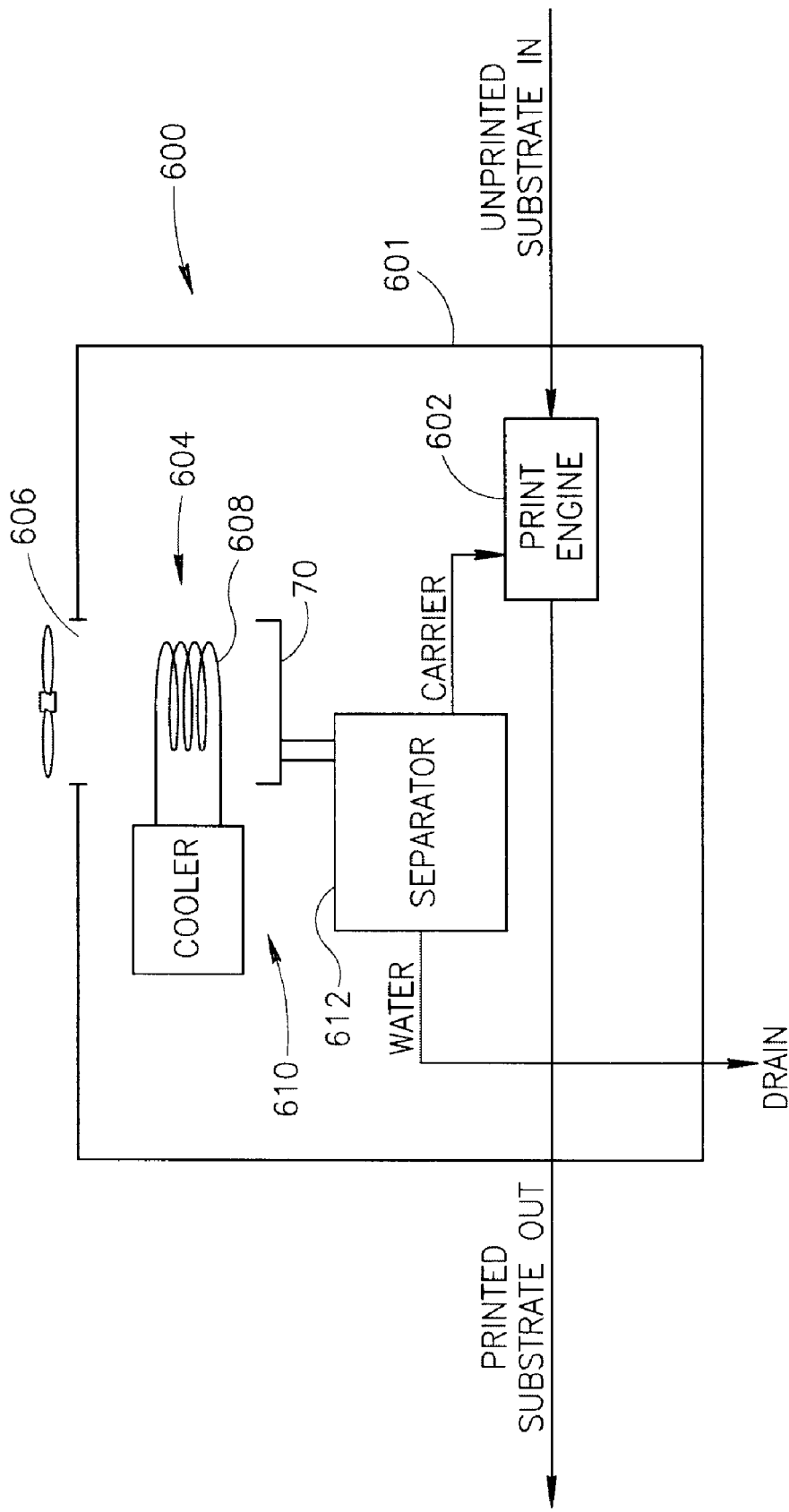
FIG. 6 is a very schematic illustration of a liquid toner printing system, in accordance with an embodiment of the invention.

In an exemplary embodiment of the invention, shown very schematically in FIG. 6, a liquid printing system 600, has a print engine 602, utilizing a volatile carrier liquid, which may, for example be, Isopar H, I, J, K or L or other volatile hydrocarbons or other volatile liquids. System 600, generally includes an enclosure 601, for keeping the evaporated liquid from escaping. Of course, openings are provided for the paper input and output, but otherwise, the printer is closed, except for inlets for air. During the printing process the carrier liquid evaporates and exits the printer through a ventilation system, generally shown at 604. By cooling the air that exits through an air exit 606, by passing the evaporated liquid, mixed with ambient air, past a cooling element 608 of a cooling system 610, the carrier liquid, together with water from the ambient air is condensed. The carrier liquid can then be recovered for reuse in the printer and the water purified to an extent that it can be discarded without special precautions being taken. Optionally, a closed system can be constructed, as shown in FIG. 6, in which a separator 612, which allows continuous use of the printer with little or no addition of oil, is part of the printer. Alternatively, the mixture of oil and water is removed and separated outside of the printer. Alternatively, it is separated in the printer, but not used in a closed loop replenishment system.

In an exemplary embodiment of the invention, a separation system such as system 100, 200, 300, 400 or 500 shown in FIGS. 1-5 is used as separator 612 to separate the fluids collected from the printing system. The oil collected by the system is reused by the printer and the water is discarded.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. A separation method comprising:
    directing a mixture of two fluids exhibiting different specific gravities into a separator in a printing system;
    separating the two fluids; and
    draining a residue containing waste and/or contaminants and situated at an interface between the two fluids from a waste outlet provided to the system.

2. A method according to claim 1 wherein a continuous flow of said mixture is supplied to said system.

3. A method according to claim 1 further comprising initializing separating by first filling said system with the fluid with the heavier specific gravity of the two fluids being separated.

4. A method according to claim 1 further comprising venting to the atmosphere in order to prevent a build up of pressure on the fluids in said system.

5. A method according to claim 1 further comprising providing safeguard outlets to prevent fluid mixing due to backflow from a disturbance in a primary outlet.

6. A method according to claim 1 further comprising purifying said fluids at a secondary purifying level.

7. A method according to claim 1 wherein the waste and/or contaminants include a fungus, a colorant, or an emulsion of the two fluids.

8. A separation method comprising:
    directing a mixture of two fluids through an inlet into a first chamber of a separator in a printing system, the two fluids exhibiting different specific gravities;
    separating the mixture in the first chamber into a lighter fluid having a lower specific gravity, a heavier fluid having a higher specific gravity, and a residue situated at an interface between the two fluids in the first chamber;
    directing the heavier fluid from the first chamber through a connection into a second chamber, the connection being situated between a portion of the two chambers below the inlet into the first chamber;
    venting built up pressure from a top of the first chamber above the inlet and from a top of the second chamber, the venting being to atmospheric pressure or between the first and second chamber; and
    draining the residue in the first chamber through a waste outlet from the first chamber.

9. The method of claim 8 wherein the residue is drained through the waste outlet above the connection and below the inlet.

10. The method of claim 8 wherein the residue is drained through the waste outlet above the connection and above the inlet.

11. The method of claim 8 wherein a continuous flow of the mixture is supplied to the separator.

12. The method of claim 8 further comprising initializing the separating by first filling the separator with the heavier fluid.

13. The method of claim 8 wherein the venting is to atmospheric pressure.

14. The method of claim 8 wherein the venting is between the first and second chamber.

15. The method of claim 8 further comprising providing a first chamber primary outlet and safeguard outlet and a second chamber primary outlet and safeguard outlet and reducing fluid mixing due to backflow from a disturbance in one or both of the primary outlets.

16. The method of claim 8 further comprising purifying the heavier and/or lighter fluid with a secondary purifying level.

17. The method of claim 8 further comprising:
    evaporating a carrier liquid from a printing engine in an enclosure of the printing system; and
    condensing the evaporated carrier along with water from airborne moisture in the enclosure to provide the mixture, wherein the lighter fluid contains the carrier and the heavier fluid contains the water.

18. The method of claim 17 wherein the carrier liquid evaporates from a liquid toner heated during printing.

19. The method of claim 8 wherein the drained residue waste and/or contaminants including a fungus, a colorant, or an emulsion of the two fluids.

20. A separation method comprising:
    evaporating a carrier liquid from a printing engine in an enclosure of a printing system;
    condensing the evaporated carrier along with water from airborne moisture in the enclosure;
    directing a mixture of the condensed carrier and the condensed water through an inlet into a first chamber of a separator in the printing system, the carrier and the water exhibiting different specific gravities;
    separating the mixture in the first chamber into the carrier, the water, and a residue situated at an interface between the carrier and the water in the first chamber;
    directing the water from the first chamber through a connection into a second chamber, the connection being situated between a portion of the two chambers below the inlet into the first chamber; and
    draining the residue in the first chamber through a waste outlet from the first chamber.

21. The method of claim 20 wherein the carrier liquid evaporates from a liquid toner heated during printing.

22. The method of claim 20 wherein the carrier liquid comprises a liquid hydrocarbon.

23. The method of claim 20 wherein the drained residue comprises waste and/or contaminants including a fungus, a colorant, or an emulsion of the carrier and the water.

* * * * *

UNITED STATES PATENT AND TRADEMARK OFFICE
CERTIFICATE OF CORRECTION

| | | |
|---|---|---|
| PATENT NO. | : 7,744,767 B2 | Page 1 of 1 |
| APPLICATION NO. | : 12/267736 | |
| DATED | : June 29, 2010 | |
| INVENTOR(S) | : Matt G. Driggers | |

It is certified that error appears in the above-identified patent and that said Letters Patent is hereby corrected as shown below:

In column 9, line 20, in Claim 19, delete "waste" and insert -- comprises waste --, therefor.

Signed and Sealed this
Tenth Day of May, 2011

David J. Kappos
*Director of the United States Patent and Trademark Office*